March 12, 1957
L. H. MOONEY
2,784,517
FISHING POLE HOLDER
Filed Oct. 12, 1953
2 Sheets-Sheet 1
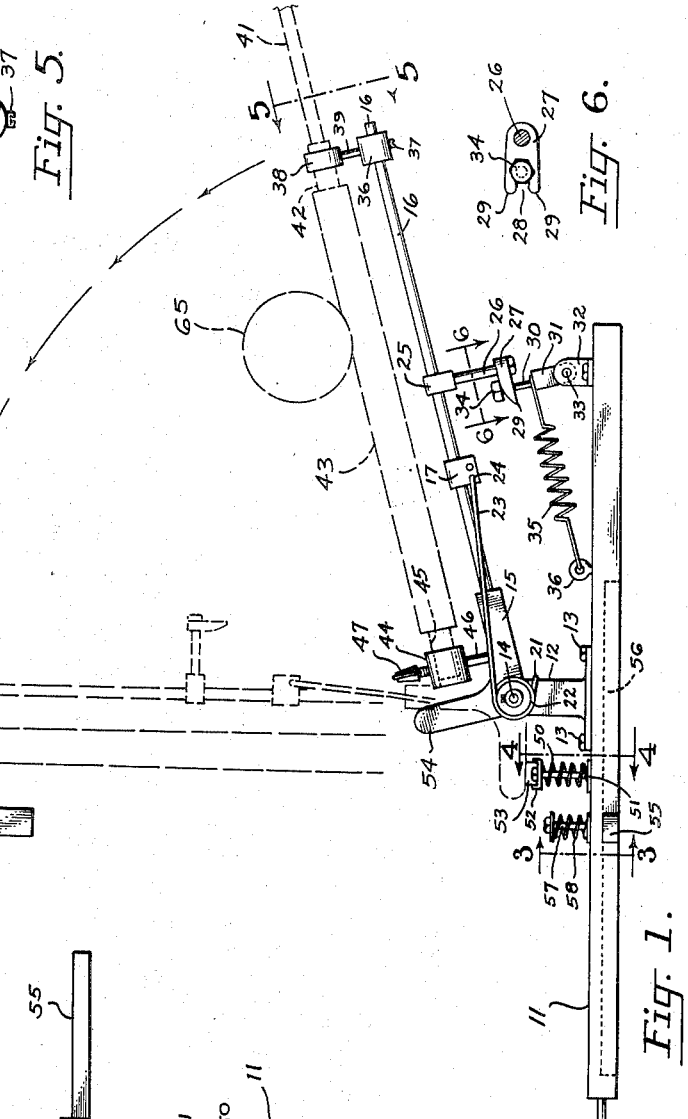
INVENTOR.
Lewis H. Mooney
BY
Oliver D. Olson
Agent

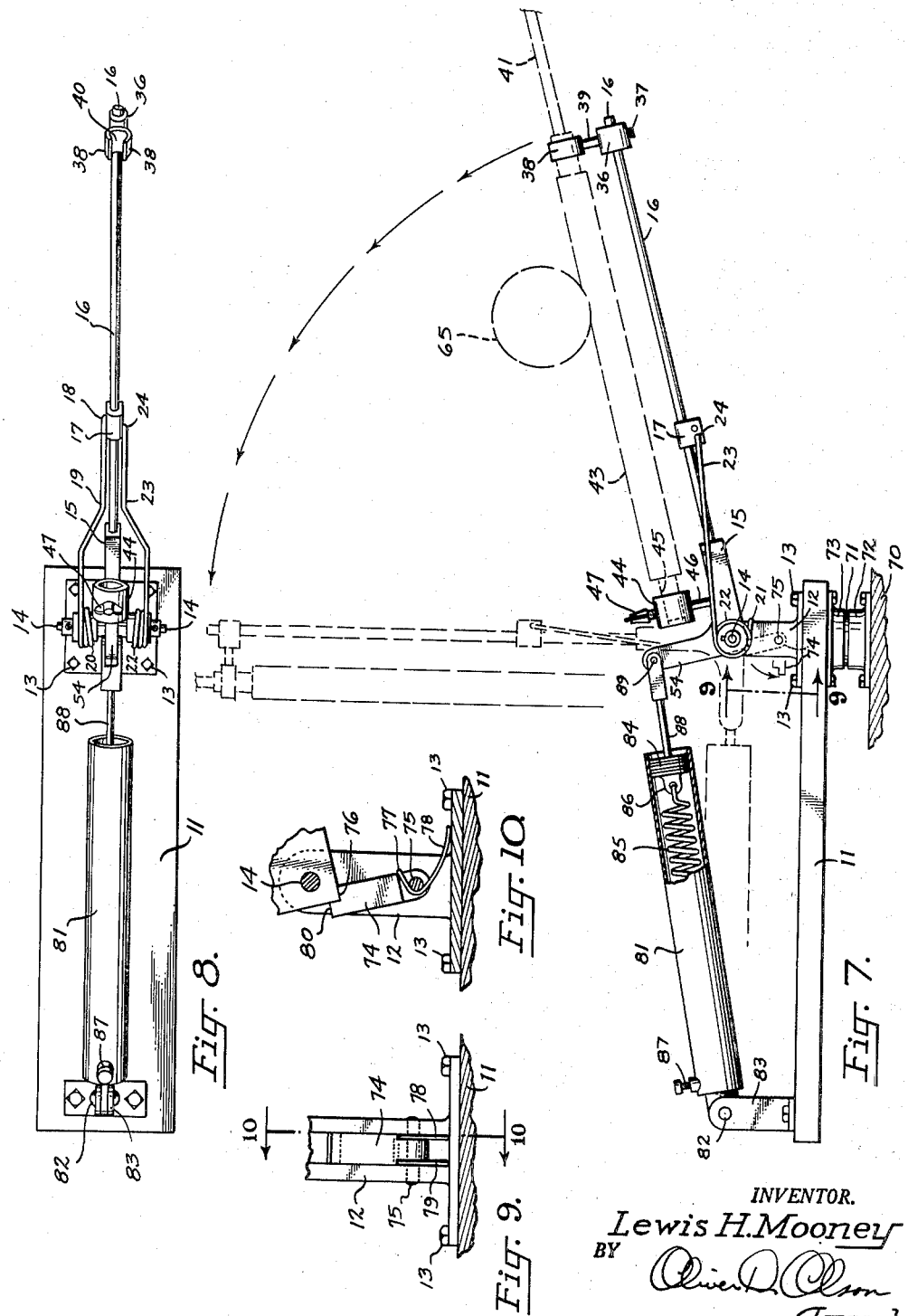

United States Patent Office 2,784,517
Patented Mar. 12, 1957

2,784,517

FISHING POLE HOLDER

Lewis H. Mooney, Bonneville, Oreg.

Application October 12, 1953, Serial No. 385,552

3 Claims. (Cl. 43—16)

This invention pertains to fishing pole holders, and relates particularly to a device for holding a fishing pole in a spring-set condition and for automatically tripping the holder to a spring tension position when a fish takes the hook.

It is a principal object of the present invention to provide a fishing pole holder which functions when a fish takes the hook to place a tension upon the fishing pole and thereby set the hook to secure the catch, in a manner which simulates the action required in manual operation of the pole.

Another important object of this invention is the provision of a fishing pole holder which automatically sets the hook when taken by a fish and which is so constructed that the fishing pole may be quickly and easily removed from the holder in the event the fisherman wishes to play the secured catch.

It is a further important object of the present invention to provide a fishing pole holder which functions to set the hook taken by a fish, the setting of the hook being accomplished without the usual jerking motion normally attending the personal excitement of making a strike.

A still further important object of the present invention is the provision of a fishing pole holder which accommodates all types of fishing poles and which does not destroy or impair the characteristic action of the fishing pole.

Still another important object of this invention is the provision of a fishing pole holder which is mounted upon a base for rotation to accommodate changes in the extended direction of the fishing pole as the fish runs in various directions after taking the hook.

A still further object of the present invention is to provide a fishing pole holder which may be utilized on land, for example on the bank of a stream, and may also be conveniently mounted upon a boat.

It is a further object of this invention to provide a fishing pole holder which is of simplified construction for economical manufacture, which is precise and delicate in its operation, is adjustable to various degrees of tension and which is operated with speed and facility.

The foregoing and other objects and advantages of the present invention will appear from the following detailed description, taken in connection with the accompanying drawings, in which:

Figure 1 is a view in side elevation of a fishing pole holder embodying the features of the present invention, the trigger portion of the holder being shown set in full lines and in released condition in dashed lines;

Figure 2 is a plan view of the holder shown in Figure 1;

Figure 3 is a sectional view taken along the lines 3—3 of Figure 1 and showing the construction of the cross brace of the holder;

Figure 4 is a sectional view taken along the line 4—4 of Figure 1 and showing the construction of the resilient bumper;

Figure 5 is a front end view as viewed in the direction of arrows 5—5 and showing the construction of a forward clamp adapted for use with the holder of the present invention;

Figure 6 is a sectional view taken along the line 6—6 in Figure 1 and showing the construction of an adjustable trigger catch forming a part of the holder;

Figure 7 is a view in side elevation of a modified form of fishing pole holder embodying the features of the present invention, parts thereof being broken away to disclose details of construction, the fishing pole support thereof being shown in full lines in set condition and in dashed lines in released condition;

Figure 8 is a plan view of the holder shown in Figure 7;

Figure 9 is a fragmentary sectional view taken along the line 9—9 in Figure 7, and showing the construction of the trigger catch forming a part of the fishing pole holder;

Figure 10 is a fragmentary sectional view taken along the lines 10—10 in Figure 9, and showing details of construction of the trigger catch.

Referring first to the modification shown in Figures 1 to 6, inclusive, there is shown an elongated base member 11. An upstanding pedestal 12 is mounted centrally upon the base member intermediate the ends of the latter, as by the bolts 13. The upper end of the pedestal is provided with a central slot extending in the longitudinal direction of the base member, thereby forming laterally-spaced upstanding bearing arms. A bell crank lever is positioned within the slot between the bearing arms and secured therein for rotation by means of the shaft 14 which extends through the bearing arms and through the intermediate section of the bell crank lever.

Secured to one arm 15 of the bell crank lever and extending axially therefrom is a rod 16. Intermediate the end of the rod there is secured an enlarged collar 17. Spaced holes in this collar receive the inturned ends of a wire spring, preferably constructed in the following manner: A continuous length of wire is bent at one end 18 and secured in one of the holes in the collar. The wire then extends rearwardly for a length 19 and is then wrapped in a spiral manner around the pivot shaft 14 on one side of the bell crank to form the spring coils 20. The wire is then bent around the forward side of the pedestal 12, forming the securing section 21 and is then wrapped in a spiral manner around the pivot shaft 14 on the opposite side of the bell crank to form the spring coils 22. The wire is then extended forwardly to the length 23 and the end 24 is then turned inward for securing in the second hole provided in the collar 17.

By the foregoing construction, the tensioned wire spring element tends to pivot the rod 16 and the bell crank in a counterclockwise direction, as indicated by the arrows in Figure 1, to the position illustrated in dashed lines.

Also secured to rod 16 forwardly of the collar 17 is a second collar 25. Attached to this collar and extending outwardly therefrom, i. e. normal to the axis of rod 16, is an arm 26. Secured to the end of this arm is a catch member 27 provided with a bifurcated end which is formed by a central slot 28 separating the spaced fingers 29. The slot is adapted to releasably receive therein the threaded end 30 of a trigger arm 31. The opposite end of the arm is secured pivotally to a bracket 32 mounted upon the base member 11, the pivot connection being made by means of pin 33. An adjustable head 34 is provided on the threaded section of the trigger arm for purposes of adjusting the length of the latter and thereby adjusting the tension of the spring assembly 18—24 for purposes of controlling the release point of the holder, as described in detail hereinafter. A coil spring 35 is secured at one end to the trigger arm and at the opposite end to an eyelet member 36 mounted in the base member 11.

Mounted adjustably upon the extended end of rod 16 is a clamp adapted to secure a fishing pole upon the holder. In the embodiment illustrated, the clamp comprises a main section 36 having a transverse hole adapted to slidably receive the rod 16 therethrough. A set screw 37 is provided to adjustably secure the main section to the rod. Opposed fixed jaws 38, preferably having a circular inner surface, are secured to a post 39 projecting from the main section 36. The jaws are spaced apart at their ends to provide a slot 40 through which to removably receive the fishing pole 41. The circular opening between the jaws is adapted to slidably retain a collar 42 of reduced diameter at the forward end of the fishing pole handle 43.

The arm 15 of the bell crank also serves as a mounting for the hollow socket 44 which is adapted to receive the reduced terminal end 45 of the fishing pole handle 43. As best shown in Figure 1, the socket is preferably mounted upon a post 46 which is pivotally supported upon bell crank arm 15. The axis of the socket is coextensive with the axis of the opposed jaws 38 of the clamp. Since the forward clamp is mounted adjustably on rod 16, the construction of the clamp and socket accommodates the attachment to the holder of fishing poles of various types and sizes. A wing nut bolt 47 is provided on socket 44 for engaging the terminal end 45 of the handle, whereby to secure the pole upon the holder.

Rearwardly of the pedestal 12 there is provided a resilient cushion to arrest the counterclockwise rotation of the bell crank. In the embodiment illustrated this cushion comprises a pair of coil springs 50 extending upwardly from the base member and secured in position by means of the upstanding bolts 51 which project through the center of the coil springs. A transverse plate 52 extends across the upper ends of the coil springs, and is secured thereto by the bolt nuts, as shown. A bumper mounting, such as a rubber block 53, is secured to the transverse plate in a position adapted to be contacted by the bell crank arm 54 when the latter rotates downwardly.

The modification illustrated in Figures 1 to 6 is particularly adapted for use upon land, for example on the bank of a stream. In order to secure the holder in a stable position, there is provided a bar 55, which, in retracted position, rests within a slot 56 formed in the under side of the base member 11. The bar is pivotally secured to the base member by means of the upstanding bolt 57 which projects upwardly through the base member, as shown. A coil spring 58 is mounted upon the base member and surrounds the bolt, being secured in position by means of the top cap 59 and the bolt nut 60. A transverse slot 61 is provided in the under surface of the base member in line with the pivot bolt 57. Thus, the bar may be pivoted from its retracted position to an extended position transversely of the base member by pushing downwardly upon the bolt against the compression of spring 58 to release the bar from its slot 56. The bar is then rotated 90° and received within the transverse slot 61. In this manner, the extended ends of the bar may be anchored to the ground, for example by piling rocks thereon, to maintain the holder in a fixed position. An eyelet 62 is also provided in the event it is desired to further secure the holder by means of a length of cord attached at one end to the eyelet and at the opposite end to a stake driven into the ground.

The operation of the fishing pole holder described hereinbefore as follows: With the holder in released condition, as indicated by the dashed lines in Figure 1, the fishing pole is secured thereto by sliding the terminal end 45 of handle 43 within the socket 44 to a depth at which the forward reduced end 42 of the handle is rearward of the clamp jaws 38. The finishing pole 41 is then received through the clamp jaw space 40 and the handle moved forwardly until the end 42 is engaged between the jaws. Wing nut bolt 47 is then tightened to secure the pole. With the base member firmly anchored to the ground or other support, the rod 16 is pivoted downwardly, i. e. clockwise around the pivot shaft 14 and trigger 30 is inserted in the slot 28 of the trigger catch member 27, with the arcuate surface of the fingers 29 engaging the sides of the adjustable nut 34. In this position the rod 16 is set at a slightly inclined angle, and the trigger spring 35 is tensioned.

It is to be assumed that the baited end of a fishing line has been properly deposited upon the water and that the reel 65 has been set to prevent unreeling of the line. It will be understood that if it is required to cast the bait into the stream, this operation is performed by hand and then the fishing pole is secured to the holder after the rod 16 has been set to the position indicated by full lines in Figure 1.

When a fish takes the bait, it is characteristic that a substantial tug is made upon the fishing line. Accordingly, since the reel has been set to prevent unreeling of the line, the tug produces a downward bowing of the fishing rod and a corresponding downward release of pressure at the junction of the trigger nut 34 and the trigger catch fingers 29, against the tension of the spring assembly 18—24. With this release of pressure at the trigger, spring 35 immediately withdraws the trigger from engagement with the catch, and the spring assembly 18—24 immediately urges the rod 16 and bell crank into counterclockwise rotation.

Ordinarily, the weight of the fish is sufficient to prevent the holder assembly from springing up quickly to its fully released position, but in the event that this should occur for some reason, the bell crank arm comes into abutment with the resilient cushion provided by the coil springs 50. In any event, with the release of the trigger and the upward rotation of rod 16, the hook becomes firmly set in the fish and the fisherman may now play his catch. This phase of the fishing operation may be performed while the fishing pole is retained within the holder, the fisherman merely being required to operate the reel. Alternatively, the fisherman may quickly release the pole from the holder by merely unloosening the wing nut 47 and removing the pole from the holder in the reverse manner described hereinbefore. The pivot post 46 permits the socket 44 to rotate and displace the pole from the front clamp.

Referring now to Figures 7 to 10, inclusive, the modification shown is primarily adapted for use with larger fish and for mounting upon a boat. Many details of this modification are similar to the modification described hereinbefore, the parts being identified by identical reference numerals. In this modification the base member 11 is adapted to be mounted for rotation upon a supporting structure 70 of the boat by means such as the pivot shaft 71 supported within the bearing-contained housings 72 and 73 secured, respectively, to the boat support and the base member.

In this second modification the trigger assembly of the first modification is eliminated. In substitution thereof, a trigger arm 74 is pivotally secured between the upward extensions of the pedestal 12 by means of the pivot pin 75. The trigger arm is provided at its upper end with a notch portion 76 adapted to engage with the intermediate corner of the bell crank arms 15 and 54, as best illustrated in Figure 10. The trigger arm is urged into counterclockwise rotation by means of a wire spring which is bent intermediate its ends to form a trigger engaging section 77, the end sections 78, 79 of the wire being then bent reversely around the pivot pin 75 and terminated forwardly thereof in engagement with the pedestal base.

The upper step 80 of the trigger arm may also be utilized to engage the corner of the bell crank to increase the tension of the releasing springs, as explained more fully hereinafter.

In order to provide for the catching of larger fish, an additional spring assembly is provided to furnish additional releasing strength. This assembly is shown to comprise a cylinder 81 mounted pivotally at its rearward end on pivot pin 82 supported upon the upstanding bracket 83 which is secured to the base member, as shown. Within the cylinder is a reciprocating piston 84. A coil spring 85 is contained within the cylinder rearwardly of the piston and is secured at one end to the cylinder and at its opposite end to the flange 86 extending from the inner side of the piston. An air escape valve 87 is provided at the rearward end of the cylinder to control the rate of rearward movement of the piston within the cylinder, in manner well-known in the art. A piston rod 88 is secured to the forward surface of the piston and is pivotally connected to the free end of bell crank arm 54 by means of the pivot pin 89.

The operation of the modification illustrated in Figures 7 to 10 is as follows:

With the fishing pole secured in the holder, as described hereinbefore, the rod 16 and bell crank are rotated in a clockwise direction around the pivot pin 14 to the full line position shown in Figure 7 against the tension of spring assembly 18—24 and spring 85. Trigger arm 74 is then rotated clockwise against the tension of spring 77—79 until the notched portion is engaged with the intermediate corner of the bell crank, as illustrated in Figure 10. As explained hereinbefore, if greater tension is desired, the trigger arm may be pivoted further until the upper section of the trigger arm engages said corner. In any event, clockwise rotation of the bell crank and rod 16 places the spring assembly 18—24 in tension, as in the first modification, and in addition the piston 84 is moved toward the forward end of cylinder 81 against the tension of coil spring 85.

When a fish takes the hook, the usual tug on the line causes a reduction in the pressure exerted by the corner of the bell crank upon the trigger arm 74, whereupon the spring 77—79 immediately urges the trigger arm into counterclockwise rotation and releasing the latter from the bell crank. The combined tension of springs 18—24 and 85 thereupon immediately urges the bell crank into counterclockwise rotation, the rod 16 ultimately reaching the limit of extension shown in dashed lines in Figure 7. The speed with which this retraction is made may be controlled by means of the escape valve 87 which limits the escape of air from within the cylinder 81 and thereby controls the rate with which the spring retracts the piston within the cylinder. For this reason, the resilient cushion provided in the first modification by coil springs 50 need not be provided in this second modification.

From the foregoing, it will be apparent that the present invention provides many advantages for the fisherman. For example, the holder has been found to be of great value to sports fishermen who are handicapped, for example by heart conditions which prevent them from indulging in the sport because of the hazardous effects caused by the excitement of making a strike. With the holder of the present invention, handicapped persons are able to enjoy the sport by utilizing the holder to secure the strike, for after the strike is made the fish may be played and landed either by merely manipulating the reel with the fish pole secured in the holder, or, alternatively, by removing the fish pole from the holder and playing the fish in a conventional manner. In either case, the holder performs the initial function of securing the strike, and it is this phase of the sport that creates the greatest excitement and hence causes the greatest harm to those persons handicapped by heart disease or other similar complications.

The holder is of additional advantage for use by the general class of sports fishermen in permitting other activity during the period of time prior to a strike. In commercial fishing, a plurality of holders may be mounted along the sides of a boat and attended by one person who need only control the reel of each installation after the strike has been made. The tension of the springs holding the fishing pole after the strike has triggered the releasing mechanism is adjustable to simulate the proper action of manual manipulation, thus providing for the handling of the fish in a manner quite similar to the characteristics of manual operation.

The releasing mechanism of the holder is extremely sensitive in all positions of adjustment. For example, with the fishing pole disposed in the slightly inclined position indicated in the drawings and with several hundred feet of line extending therefrom in substantially a horizontal plane, the characteristic pull on a line attending a strike is sufficient to trip the triggering mechanism and release the catch. By adjusting the triggering mechanism the pressure required to release the latter may be controlled within precise limits for most effective operation.

It is to be noted that the holder of this invention functions to secure a strike without altering in any way the characteristic action of the fishing pole. The flexibility of the pole is maintained exactly as though it were held and manipulated by hand because the triggering mechanism is not connected mechanically with the pole or fishing line. As the line is tensed when a fish takes the hook, the fishing pole is flexed downwardly in its natural way, thereby sufficiently relieving the frictional pressure securing the trigger to allow the latter to release and swing the pole upwardly.

It will be apparent to those skilled in the art that various changes may be made in the details of construction described hereinbefore without departing from the scope and spirit of the present invention. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. A fishing pole holder comprising a base member, a bell crank member mounted pivotally on the base member for movement between cocked and uncocked positions, the bell crank member having outwardly diverging arms, means on one of said arms for securing a fishing pole handle thereto with the fishing pole projecting freely therefrom for normal flexing action, trigger means releasably interconnecting the base member and bell crank member when the latter is in its cocked position, resilient means interconnecting the trigger means and the base member and arranged to provide maximum tension when the trigger means interconnects the bell crank member and the base member, whereby to urge the trigger means to disconnecting position, a cylinder mounted pivotally at one end on the base member, a piston slidable within the cylinder and connected pivotally to the second arm of the bell crank member, spring means interconnecting the cylinder and piston and urging the bell crank member to its uncocked position, and valve means adjacent the end of the cylinder toward which the piston is urged by the spring means, the valve means interconnecting the interior of the cylinder and the atmosphere for controlling the speed of movement of the piston and thereby regulating the speed of rotation of the bell crank member to its uncocked position, the spring means being stronger than the resilient means, whereby the trigger means is held in interconnecting position against the tension of the resilient means by the greater tension of the spring means and the trigger means is released when the bell crank member is pivoted toward further cocked position by flexing of the fishing pole as a strike is made.

2. The fishing pole holder of claim 1 wherein the valve means includes an element adapted to be adjusted for varying the speed of rotation of the bell crank member to its uncocked position.

3. A fishing pole holder comprising a base member, a bell crank member mounted pivotally on the base member for movement between cocked and uncocked position, the bell crank member having outwardly diverging arms, means on one of said arms for securing a fishing pole handle thereto with the fishing pole projecting freely therefrom for normal flexing action, trigger means releasably interconnecting the base member and bell crank member when the latter is in its cocked position, trigger releasing means operably connected to said trigger means and adapted to release the bell crank member from said cocked position when a strike is made, a cylinder mounted pivotally at one end on the base member, a piston slidable within the cylinder and connected pivotally to the second arm of the bell crank member, spring means interconnecting the cylinder and piston and urging the bell crank member to its uncocked position, and valve means adjacent the end of the cylinder toward which the piston is urged by the spring means, the valve means adjustably interconnecting the interior of the cylinder and the atmosphere for controlling the speed of movement of the piston and thereby regulating the speed of rotation of the bell crank member to its uncocked position.

References Cited in the file of this patent

UNITED STATES PATENTS

| | | |
|---|---|---|
| 834,414 | Schmidt | Oct. 30, 1906 |
| 1,856,477 | Gerline | May 3, 1932 |
| 2,618,090 | Kimura | Nov. 18, 1952 |
| 2,624,536 | Herzog | Jan. 6, 1953 |
| 2,703,465 | Stefano | Mar. 8, 1955 |
| 2,713,741 | Gnagy | July 26, 1955 |

FOREIGN PATENTS

| | | |
|---|---|---|
| 488,788 | Canada | Dec. 16, 1952 |
| 509,012 | France | Oct. 29, 1920 |